(12) United States Patent
Wang et al.

(10) Patent No.: US 8,066,919 B2
(45) Date of Patent: Nov. 29, 2011

(54) SPHERICAL RUBBER CHEMICALS AND THE METHOD FOR PREPARING THE SAME

(75) Inventors: Nongyue Wang, Shanghai (CN); Xiaohui Mao, Shanghai (CN); Xiaogen Feng, Shanghai (CN); Qianwan Cheng, Shanghai (CN); Luxin Wang, Shanghai (CN)

(73) Assignee: Jiangsu Sinorgchem Technology Co., Ltd. (CN)

( * ) Notice: Subject to any disclaimer, the term of this patent is extended or adjusted under 35 U.S.C. 154(b) by 365 days.

(21) Appl. No.: 12/445,900

(22) PCT Filed: Oct. 15, 2007

(86) PCT No.: PCT/CN2007/002953
§ 371 (c)(1),
(2), (4) Date: Apr. 16, 2009

(87) PCT Pub. No.: WO2008/052414
PCT Pub. Date: May 8, 2008

(65) Prior Publication Data
US 2010/0314789 A1    Dec. 16, 2010

(30) Foreign Application Priority Data
Oct. 17, 2006 (CN) .......................... 2006 1 0135744

(51) Int. Cl.
*B29B 9/10*  (2006.01)
(52) U.S. Cl. ............................................ 264/9; 264/13
(58) Field of Classification Search ........................ None
See application file for complete search history.

(56) References Cited

U.S. PATENT DOCUMENTS

| 1,378,084 | A | * | 5/1921 | Bacon et al. ..................... 264/13 |
| 3,334,159 | A | * | 8/1967 | Campbell ........................ 264/13 |
| 4,149,837 | A | * | 4/1979 | Baker et al. ..................... 425/10 |
| 4,402,859 | A | | 9/1983 | Tamura et al. |
| 7,413,690 | B1 | * | 8/2008 | Cheboyina et al. ............. 264/13 |
| 2001/0005516 | A1 | * | 6/2001 | Yoshii et al. ....................... 425/6 |

FOREIGN PATENT DOCUMENTS

CN    2281836    5/1998

(Continued)

OTHER PUBLICATIONS

International Search Report from PCT/CN2007/002953, date of mailing Jan. 31, 2008.
International Preliminary Report on Patentability from PCT/CN2007/002953, date of mailing Apr. 22, 2009.

(Continued)

*Primary Examiner* — Mary F Theisen
(74) *Attorney, Agent, or Firm* — Hamilton, Brook, Smith & Reynolds, P.C.

(57) ABSTRACT

The present invention provides spherical rubber chemicals and the method for preparing the same. The spherical rubber chemicals of the present invention include spherical antioxidants, spherical vulcanization agents, spherical processing aids, spherical reinforcing agents, or spherical adhesive agents. With the spherical rubber chemicals of the present invention, the shortcomings of powdery or semi-spherical rubber chemicals are overcome, including eliminating the dust pollution during granulation procedure and avoiding the raw material loss and the environmental pollution, while solving the quality problem of lower melting point of product caused by the presence of fine powder crystal. Furthermore, the resultant rubber chemicals has an improved smoothness of surface, which is helpful to improve the flowing and mixing behaviors of the rubber chemicals in mixing or open milling process with rubbers.

14 Claims, 2 Drawing Sheets

FOREIGN PATENT DOCUMENTS

| | | |
|---|---|---|
| CN | 1515350 | 7/2004 |
| CN | 1565715 | 1/2005 |
| JP | 57000146 | 1/1982 |
| JP | 58008546 | 1/1983 |
| JP | 62086032 | 4/1987 |
| TW | 262484 | 11/1995 |
| WO | WO 2008/052414 A1 | 5/2008 |

OTHER PUBLICATIONS

Office Action from Chinese Patent Office, Chinese Application No. CN200610135744, Dated May 8, 2009.

Chen, Song, et al. "Melting Granulating Technology and its Application in Chemical Products," *China Powder Science and Technology*, 10:93-95 (Nov. 2004).

\* cited by examiner

A  B  C

SPHERICAL RUBBER CHEMICALS AND THE METHOD FOR PREPARING THE SAME

RELATED APPLICATIONS

This application is the U.S. National Stage of International Application No. PCT/CN2007/002953, filed Oct. 15, 2007, published in Chinese, and claims priority under 35 U.S.C. §119 or 365 to Chinese Application No. 200610135744.X, filed Oct. 17, 2006.

TECHNICAL FIELD

The present invention relates to spherical rubber chemicals and the method for preparing the same, more specifically, to spherical rubber antioxidants, vulcanization agents, processing aids, reinforcing agents and adhesive agents, especially to the spherical granules of p-phenylenediamine type rubber antioxidant N-1,3-dimethylbutyl-N'-phenyl-p-phenylenediamine or N-isopropyl-N'-phenyl-p-phenylenediamine and the method for preparing the same.

BACKGROUND ART

Rubber chemicals are important chemical materials in the rubber industry, and they play an important role in improving the rubber performance, such as upgrading the rubber quality and increasing the rubber processing level. With the continuous progress in the rubber industry, there is a higher demand for the general quality of rubber chemicals. At present, the rubber chemicals provided in market are generally of powdery or semispherical shape. The dust of powder rubber chemicals are likely to fly in the air, thereby causing loss of the rubber chemicals and imparting adverse effects on the environment.

Currently, a common granulation method for rubber chemicals is the rotary belt condensation granulating process with the following operating principle: utilizing the low melting point (or softening point) characteristics of the material, the molten liquid material is distributed evenly on a steel belt moving at a uniform speed below a special distributing device depending on the viscosity range of the molten material. Meanwhile, under forced cooling of a continuously spraying device provided under the steel belt, the material is cooled and solidified during the movement and transportation procedure, thereby achieving the purpose of continuous granulation and formation. According to the material properties and the intended use, the distribution mode of intermittent drippling, continuous flowing and full-width overflowing may be employed to obtain semisphere, bar and sheet product, respectively. The method has the following defects: 1) the cooling medium removes heat from the molten liquid via the steel belt, and heat is transferred from the molten liquid to the steel belt and then to the cooling medium. So the heat transfer efficiency decreases significantly. Since the main heat transfer mode is heat conduction between the steel belt surface and the cooling medium, the length of steel belt must be prolonged to increase the throughput, resulting in larger facility bulk and lower space utilization efficiency. 2) Since the liquid drops are formed on the steel belt, the resultant granules show a semispherical or flat shape. Although they have some advantages over the powdery rubber chemicals, the semispherical or flat rubber chemicals still have defects. Specifically, some arris of sharp angle are formed at the boundary of spherical surface and flat surface in the granulation process, and they may be broken off by collision during packaging and transportation and the reproduced powders also pollute the environment. In addition, the formed granules are scraped away from the steel belt at the end of steel belt, in which process dust may fly in the air. The presence of fine powders may cause decrease of melting point in partial regions of the rubber chemicals. Also, the fine powders may join together, conglomerate and harden and the wholly or partially hardening of the rubber chemical products makes a large bulk which deteriorates the product quality seriously. Thus, there requires novel form of rubber chemicals which solve the above problems in the field of rubber chemical granulation.

SUMMARY OF THE INVENTION

The object of the invention is to improve the unfavorable granule shape in the existing granulation of rubber chemicals and solve the problems of dust pollution caused by the rubber chemicals of powder, semisphere or other irregular shape in the granulation process, low heat transfer efficiency, low production capability and relative high equipment costs, and to alleviate the quality problems of lower melting point in regions of the product due to the presence of fine powder crystals and wholly or partially hardening of the product due to joining, hardening and conglomeration of fine powders.

The present inventors have found in various studies that the rubber chemicals formed in spherical shape eliminate the defects of the powdery or semispherical rubber chemicals prepared according to the existing manufacture processes. In contrast, the rubber chemicals according to the present invention have a much larger number of granules passing through sieve and a significantly increased granulation rate of product, thereby preventing the dust pollution caused in the granulation process and avoiding the material loss and environmental pollution. In addition, the quality problems of lower melting point in regions of the product due to the presence of fine powder crystals and wholly or partially hardening of the product due to joining, hardening and conglomeration of fine powders are also solved. Meanwhile, the rubber chemical granules have a higher surface smoothness which is helpful for flowing and mixing of the rubber chemicals in mixing or open milling process with rubbers. The present invention is carried out accordingly.

Thus, the present invention provides novel spherical rubber chemicals, preferably the spherical granules of the rubber chemicals have an average diameter ranging from 0.2 mm to 10 mm.

The spherical rubber chemical according to the present invention includes spherical rubber antioxidants, spherical vulcanization agents, spherical processing aids, spherical reinforcing agents, and spherical adhesive agents.

The spherical vulcanization agents include spherical 2-mercaptobenzothiazole, dibenzothiazole disulfide, N-tert-butyl-2-benzothiazole sulphenamide, N-cyclohexyl-2-benzothiazole sulphenamide, N,N-dicyclohexyl-2-benzothiazole sulphenamide and N-oxidiethylene-2-benzothiazole sulphenamide.

The spherical vulcanization agents also include N-tert-butyl-bis(2-benzothiazole) sulphenamide, N-cyclohexyl-bis(2-benzothiazole) sulphenamide, tetraisobutylamino thiuram monosulfide, tetraisobutylamino thiuram disulfide, tetrabenzyl thiuram disulfide, tetramethyl thiuram disulfide, tetraethyl thiuram disulfide, tetramethyl thiuram monosulfide, pentamethylenethiuram hexasulfide, N,N-dithiodicaprolactam, N-oxydiethylenethiocarbamoyl-N'-tert-butyl sulphenamide, diphenylguanidine, diorthotolylguanidine, and vulcanizing resins having a softening point lower than or equal to 250° C., including para-tert-butylphenol formaldehyde resin, para-tert-octylphenol formaldehyde resin and para-(1,1,3,3-tetramethylbutyl)-phenol formaldehyde resin bromide.

The rubber antioxidants include N-1,3-dimethylbutyl-N'-phenyl-p-phenylenediamine, N-isopropyl-N'-phenyl-p-phenylenediamine, N,N'-bis(1,4-dimethylpentyl)-p-phenylenediamine, 2,2,4-trimethyl-1,2-dihydroquinoline polymer, octylated diphenylamine, N-phenyl-N'-cyclohexyl-p-phenylenediamine and 4-aminodiphenylamine, preferably spherical p-phenylenediamine antioxidant N-1,3-dimethylbutyl-N'-phenyl-p-phenylenediamine or N-isopropyl-N'-phenyl-p-phenylenediamine.

The rubber antioxidants also include N-phenyl-N'-α-methylbenzyl-p-phenylenediamine, N,N'-ditolyl-p-phenylenediamine, and 2,4,6-tri(N-1,4-dimethyl)pentyl-p-phenylenediamine-1,3,5-triazine.

The spherical processing aids according to the present invention include spherical anti-scorching agents, spherical plasticizers, spherical homogenizing agents, spherical tackifiers, and spherical releasing agents.

The spherical anti-scorching agents include spherical N-cyclohexylthiophthalimide.

The spherical plasticizers include spherical Plasticizer A and pentachlorothiophenol.

The spherical homogenizing agents include spherical resins having a softening point lower than or equal to 250° C., including a polymer resin of one or more saturated or unsaturated aromatic monomers, naphthenic monomers and aliphatic monomers, or a mixture of two or more saturated or unsaturated aromatic resins, naphthenic resins and aliphatic resins.

The spherical tackifiers include spherical resins having a softening point lower than or equal to 250° C., including petroleum resins, C9 petroleum tackifier resins, complex C9 petroleum tackifier resins, modified petroleum alkylphenol resins, p-tert-butylphenol fomaldehyde resins, p-tert-octylphenol fomaldehyde resins, coumarone resins, or phenylethylene-indene resins.

The spherical releasing agents include spherical internal releasing agent AT-16.

The spherical adhesive agents include spherical cobalt decanoate, cobalt naphthenate, and cobalt stearate.

The reinforcing agents include phenolic resins, oil-modified phenolic resins or petroleum resins having a softening point lower than or equal to 250° C.

Another aspect of the present invention provides a method for preparing the above spherical rubber chemicals, comprising an overhead granulation step, a cooling and forming step and a cooling liquid-removing step.

According to a preferable embodiment of the present invention, the method of the present invention further comprises a pre-crystallizing step prior to the overhead granulation step.

In a preferable embodiment of the present invention, in the overhead granulation step, a material tank and a distribution plate are detached from each other and are separated by a thermal insulating layer.

In another preferable embodiment of the present invention, in the head granulation step, a heating and/or cooling medium is provided for the distribution plate; small holes and intermediate holes are disposed from top to bottom in the distribution plate, the small holes have a diameter between 0.1 and 5 mm and the intermediate hole nozzles have a diameter between 0.2 and 10 mm.

According to a further preferable embodiment of the present invention, large holes are provided below the intermediate holes with a distance of 0.5-5 mm between the inner wall of a large hole and the outer wall of the intermediate hole nozzle. Preferably, a chamfer angle is formed at the lower end of the nozzle.

During the overhead granulation step, the material drips naturally by gravity, under pressure by reciprocating motion or under a constant pressure by a high viscosity feeding pump. Preferably, reciprocating motion facilitation is adopted.

During the overhead granulation step, the dripping rate from a nozzle is 1-4 drops/second.

In another preferable embodiment of the present invention, a surfactant is added into the cooling liquid in a cooling tower and/or ultrasonic wave is applied thereto in the cooling and forming step. Preferably, the cooling liquid is at least one selected from the group consisting of water, aqueous ammonia, an aqueous solution of a salt and an organic substance. In some preferable embodiments of the present invention, the cooling liquid is selected from the group consisting of water, aqueous ammonia, an aqueous solution of methanol, an aqueous solution of sodium chloride, gasoline or acetone. Preferably, the surfactant is at least one selected from the group consisting of polyethylene glycol ether, polypropylene glycol ether, fatty alcohol polyoxyethylene ether, alkyl benzenesulfonate compounds, quaternary ammonium salt compounds, alkyl alcohol ammonium type surfactants and betaine type surfactants. Preferably, the fatty alcohol in the fatty alcohol polyoxyethylene ether has 6-18 carbon atoms and the polymerization degree of polyoxyethylene is 3-25. Preferably, the betaine type surfactant is selected from a group consisting of cocoamidopropyl betaine, dimethylalkyl betaine and N,N-dimethyl-N-alkoxymethylene betaine.

The term "spherical" as used herein refers to sphere or spheroid having a diameter difference of ≦20%, and includes the sphere or spheroid having minor surface defects. The term "diameter difference" as used herein refers to a percentage of the difference between the length of a line segment formed by linking two arbitrary points on the surface of the sphere or spheroid through the center of gravity of the sphere or spheroid and the average length of such line segments in respect to the said average length.

DETAILED EMBODIMENTS OF THE INVENTION

The present invention provides a spherical rubber chemical, wherein the preferable average diameter of the spherical rubber chemical is 0.2-10 mm. In addition, the present invention also provides the following method for preparing the spherical rubber chemical. They will be described in detail thereafter.

Figure 1:
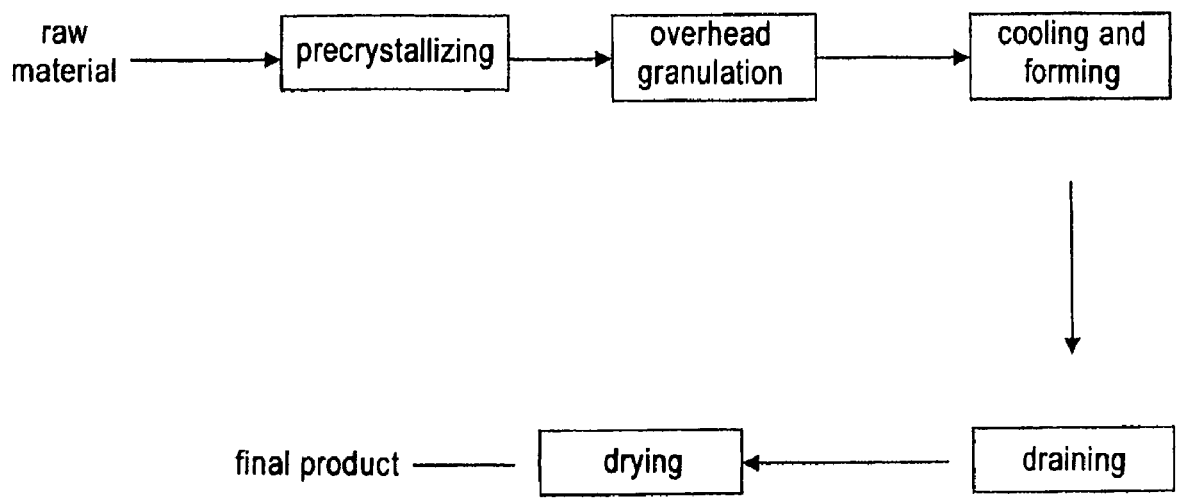
FIG. 1 is a flow chart showing formation of the spherical granules of rubber chemicals according to a preferable embodiment of the present invention.

As shown in FIG. 1, raw material of the rubber chemical is pumped to the cooling and precrystallizing part, and after continuous circulating and cooling, a portion of the material reach a precrystallizing state and is delivered to a temperature-keeping tank for molten material in the head part for granulation. Alternatively, depending on its properties, the material may be fed directly into the temperature-keeping tank for molten material in the head part for granulation without the precrystallizing step. The material is granulated with a designed distribution plate. The extruded molten granules of spherical shape fall down into a cooling tower in which the material and the cooling liquid sufficiently exchange heat and at the same time the material solidifies slowly into solid spherical granules. The resultant solid spherical granules are further treated to remove the cooling liquid, wherein most cooling liquid may be removed by draining and then the spherical granules are dried to remove the remaining cooling liquid.

Before the overhead granulation, the material, especially that from the precrystallizer, has very poor flowability since they are in a state between solid and liquid. And since the material has a high crystal seed concentration but does not crystallize, it has a variable viscosity varying from tens of CP to tens of thousands even million of CP. Thus, this requires a close control. Proper control over the viscosity range and over the crystallizing state of the material is a critical factor in granulation.

In order to meet the high precision requirement of crystallization temperature control, especially in the overhead granulation step of the rubber chemicals, we adopt multiple means to stabilize the processing parameter, the temperature. Specifically, a temperature-keeping means is provided to the outside of the material tank, the distribution plate is maintained at a constant temperature, and the temperature of pipelines and the temperature of some moving parts are maintained. Various temperature-keeping means can be selected depending on different properties, for example, providing a heating and/or cooling medium including steam, heat conducting oil and water of different temperatures, or adopting an electrically heating control system to control strictly the precision of the temperature-keeping system, thereby keeping a constant temperature.

The material is formed into a spherical shape after dripping from the nozzle. The state of the material in dripping is important for the formation of granules. Material drops may be formed by naturally trickling under gravity, under pressure by reciprocating motion or under a constant pressure applied on the material by a high viscosity feeding pump, so that the material is in a spherical shape after dripping from the nozzle. When the liquid material in the material tank has a very high viscosity, the mass transfer and heat transfer are very difficult. A little longer retention time will cause solidification or partial coagulation of the material. So an agitation means or a coil pipe may be used to improve the mass transfer and heat transfer. For a material with high crystal seed concentration and being prone to coagulation, dripping facilitated by reciprocating motion is preferable. Any method and apparatus for pressing materials by reciprocating motion in the art can be used in the present invention. In a preferable embodiment, a reciprocating pump is connected to the material tank, and a coil pipe is disposed in the material tank. A heating and/or cooling medium passes through the coil pipe to accurately control the temperature of the material. In an embodiment of the invention, a preferable heating and/or cooling medium is water. The coil pipe moves following the frequency of the reciprocating pump, so that the material in the material tank is held in a moving state and does not coagulate while the dripping of material is facilitated by the reciprocating motion. In addition, the frequency of the reciprocating pump is adjustable. Preferably, the dripping rate of the nozzle is controlled at 1-4 drops/second by adjusting the frequency of the reciprocating pump and more preferably, the dripping rate of the nozzle is controlled at 2-3 drops/second. Thus, the material will be drawn back as the reciprocating pump and coil pipe move upward, and when moving downward under a pressure, the material is extruded as spherical granules through the nozzle and falls down, thereby avoiding formation of material bar or jam of the nozzle.

Considering that the drops of material with low crystal seed concentration are likely to break and conglutinate in water and that the materials with high crystal seed concentration are likely to solidify to block the nozzles, in the light of the characteristics of melt granulation process, the material tank is designed to be separated from the distribution plate with a thermal insulating layer which has openings only at places corresponding to the nozzles to allow a liquid to pass through the nozzles. Therefore, the material tank may have a different temperature from the distribution plate and the heat transfer between the material tank and the distribution plate is blocked. Thus, the temperature of the distribution plate can be adjusted according to the state of material in the material tank, achieving the objective of controlling the state of the material. This design has more flexibility in regulation and controlling of the material and is more feasible in industrial production.

Figure 3:
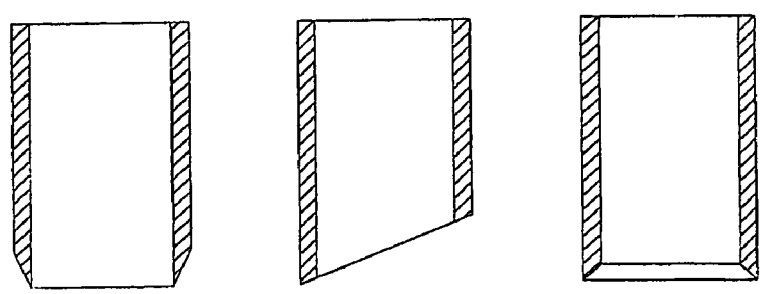
FIG. 3 is a schematic diagram showing three difference forms of nozzles A, B and C used in the invention, wherein the nozzles A and C have chamfer angles at their lower ends, i.e. an outer chamfer angle at the lower end of nozzle A and an inner chamfer angle at the lower end of nozzle C.

Three different holes can be disposed in the distribution plate from top to bottom: small holes for controlling the flow rate, intermediate holes with nozzles for dripping and formation of material, and large holes for shielding and temperature-keeping. Depending on the material condition, for example, for a material having a high crystal seed concentration and unlikely to coagulate, the temperature-keeping large holes can be omitted. Depending on the characteristics of products, the distribution plate preferably has a plurality of evenly-distributed small holes, intermediate holes, optional large holes and inner temperature-keeping channels. The small holes have a diameter of 0.1-5 mm, the diameter of the intermediate hole nozzles depends on the required diameter of granules and is 0.2-10 mm, and the distance between the inner wall of a large hole (i.e. a temperature-keeping hole) and the outer wall of an intermediate hole nozzle is 0.5-5 mm. The nozzle may have different forms, for example the nozzle A, B and C shown in FIG. 3. Preferably, the nozzle has a chamfer angle at its lower end, and the preferable nozzles among A, B and C are nozzles A and C. The nozzle A has an outer chamfer angle at its lower end, and nozzle C has an inner chamfer angle at its lower end. More preferably, the nozzle is nozzle A which has an outer chamfer angle. Moreover, temperature-keeping channels are formed between the nozzles of the distribution plate. A heating and/or cooling medium, such as steam, water or conducting oil, may be provided in the temperature-keeping channels according to the temperature requirement to keep a constant temperature of the distribution plate, thereby maintaining a stable material state.

In the cooling and forming step, different cooling liquids may be selected for the granulation of different products. The cooling liquid may be water, aqueous ammonia, an aqueous solution of a salt, an organic substance and a mixture of two or more of the same. For example, the cooling liquid may be an aqueous solution of methanol, an aqueous solution of sodium chloride, gasoline, acetone, etc.

In a preferable embodiment of the present invention, the rubber chemical material comes into contact directly with the cooling liquid in the cooling and forming step. Water is used as the cooling liquid so that the heat exchanging efficiency is increased significantly. Since water has a high specific heat and a large convective heat transfer coefficient, direct contact takes the advantage of the high heat exchange efficiency of water. Meanwhile, a liquid drop in water exchanges heat with water via its all spherical surface, thereby achieving a three-dimensional heat transfer. While in the conventional art, the cooling device is a steel belt and water spray which have lower thermal conductivity and lower heat transfer coefficient. Moreover, the particles are cooled via the contact surface of the steel belt, so the heat transfer efficiency is limited. In a preferable embodiment of the present invention, a cooling tower is used in the cooling and forming step, so the equipment cost is reduced and the equipment efficiency per unit volume is increased significantly.

In another preferable embodiment of the present invention, the preferable cooling liquid is an aqueous solution of methanol in the cooling and forming step. Since the aqueous solution of methanol has a lower density, the rubber chemical granules will fall down faster in the cooling liquid and are prevented from floating on the liquid to facilitate the formation of the granules.

During falling and cooling of the material, it is frequently found that the material has an insufficient hardness even it has formed into granules. In the cooling and forming step, the temperature of the cooling liquid is very important for the solidification into solid granules, and it is important to control the temperature of the cooling liquid properly. A suitable temperature of the cooling liquid may be selected according to the properties of the material, such as the melting point of the material. For example, in a further preferable embodiment of the present invention, the rubber chemical is a p-phenylenediamine type antioxidant N-1,3-dimethylbutyl-N'-phenyl-p-phenylenediamine or N-isopropyl-N'-phenyl-p-phenylenediamine, the cooling liquid is water, aqueous ammonia or an aqueous solution of methanol, preferably having a temperature of 10-40° C., and more preferably having a temperature of 20-35° C.

In a preferable embodiment of the present invention, a surfactant is sprayed onto the surface of the cooling liquid in the cooling and forming step. If the rubber chemical granules sedimentate with a low sedimentation rate due to the presence of surface tension, it is likely that a drop of the rubber chemical falls down before the previous drop settles down, resulting in the superposition of two or even more drops which will impair the granule shape and the formation effect. In order to prevent this phenomenon, a surfactant sprayed on the surface of cooling liquid (such as water) or ultrasonic wave produced by an ultrasonic generator is employed to reduce the surface tension to facilitate the fast sedimentation of the granules, thereby solving the above problem.

The surfactant which may be added into the cooling liquid to facilitate the granule sedimentation includes, but not limited to, the following examples: polyethers, such as polyethylene glycol ether, polypropylene glycol ether and fatty alcohol polyoxyethylene ether, and the mixture thereof; alkyl benzene sulfonate compounds; quaternary ammonium salt compounds; alkyl alcohol ammonium type surfactants; as well as betaine type surfactants, such as cocoamidopropyl betaine, dimethylalkyl betaine, N,N-dimethyl-N-alkoxymethylene betaine, etc. Specifically, the surfactant may be polyethylene glycol ether, such as polyethylene glycol dimethyl ether (having a molecular weight of 200-1000), polyethylene glycol diethyl ether (having a molecular weight of 200-1000) and polyethylene glycol methyl ethyl ether (having a molecular weight of 200-1000); polypropylene glycol ether, such as polypropylene glycol dimethyl ether (having a molecular weight of 200-1000), polypropylene glycol diethyl ether (having a molecular weight of 200-1000) and polypropylene glycol methyl ethyl ether (having a molecular weight of 200-1000); fatty alcohol polyoxyethylene ether, such as those having 6-18 carbon atoms in the fatty alcohol part and 3-25 of polymerization degree of polyoxyethylene, for example, AEO-7, i.e. $C_{12}H_{25}O(CH_2CH_2O)_7H$. The surfactants of different performances can be selected for different rubber chemicals and different cooling liquids.

Drying of the formed rubber chemical granules may utilize a fluidized bed or a vibrated fluidized bed. A band-type drying process and common oven drying process may also be used.

In the method according to the present invention, the rubber chemical material produces a spherical outer surface under the action of surface tension or interfacial tension, so the resultant products have a good sphericity, that is, they are substantially in a spherical shape. The products thus obtained have an improved appearance quality, which improves the flowing and mixing behaviors of the rubber chemicals in mixing or open milling process with rubbers. According to the method of the present invention, the dust pollution of powdery materials is prevented, and the various dust pollution caused by break-off and collision of the arris at the boundary of spherical surface and flat surface of the semi-spherical granules are also avoided during the subsequent procedures such as packaging, transportation, discharging and using. With change in the granule shape, the present invention prevents the reduction of melting point due to too much dust in the subsequent procedures, so the quality problem of product is solved.

According to the method of the present invention, little dust is produced in the granulation process. Although friction and collision may occur between the granules in some procedures, almost no dust is produced before drying since a small amount of cooling liquid remains on the surface of the granules and reduces the frictional strength largely. While some dust is produced in the drying process, since the fluidized bed for drying is closed, the dust is collected and can not pollute the environment or affect the operator's health. The steel belt cooling process utilizes an open system and the granules must be scraped away from the steel belt, the produced dust accumulates as time lapses and will cause a lot of harm. In contrast, the granulation process according to the present invention makes a significant progress and improvement.

The rubber chemical granules obtained according to the method of the present invention have not only a spherical shape but also a smooth surface. This is helpful to reduce the dust produced from friction during bag dumping and transportation.

The spherical rubber chemicals of the present invention as well as the spherical rubber chemicals that can be prepared according to the method of the present invention include, but not limit to, the following examples: antioxidant 4020 (N-1,3-dimethylbutyl-N'-phenyl-p-phenylenediamine), 4010NA (N-isopropyl-N'-phenyl-p-phenylenediamine), 4030 (N,N-bis(1,4-dimethylpentyl)-p-phenylenediamine), RD (2,2,4-trimethyl-1,2-dihydroquinoline polymer), ODA (octylated diphenylamine), 4010 (N-phenyl-N'-cyclohexyl-p-phenylenediamine), intermediate RT Base (4-aminodiphenylamine); vulcanization agents M (2-mercaptobenzothiazole), DM (dibenzothiazole disulfide), NS(N-tert-butyl-2-benzothiazole sulphenamide), CZ (N-cyclohexyl-2-benzothiazole sulphenamide), DZ (N,N-dicyclohexyl-2-benzothiazole sulphenamide), NOBS (N-oxidiethylene-2-benzothiazole sulphenamide), SPPD (N-phenyl-N'-α-methylbenzyl-p-phenylenediamine), DTPD (N,N'-ditolyl-p-phenylenediamine), TAPDA (2,4,6-tri-(N-1,4-dimethyl)pentyl-p-phenylenediamine-1,3,5-triazine), TBSI (N-tert-butyl-bis(2-benzothiazole) sulphenamide), CBBS (N-cyclohexyl-bis(2-benzothiazole) sulphenamide), Cure-riteIBM (tetraisobutylamino thiuram monosulfide), Cure-riteIBT (tetraisobutylamino thiuram disulfide), TBZTD (tetrabenzyl thiuram disulfide), TMTD (tetramethyl thiuram disulfide), TETD (tetraethyl thiuram disulfide), TMTM (tetramethyl thiuram monosulfide), DPTT (pentamethylenethiuram hexasulfide), DTDC (N,N-dithiodicaprolactam), OTTOS (N-oxydiethylenethiocarbamoyl-N'-tert-butyl sulphenamide), DPG (diphenylguanidine), DOTG (diorthotolylguanidine), para-tert-butylphenol formaldehyde resin, para-tert-octylphenol formaldehyde resin, bromomethylhydroxymethyl para-tert-octylphenol formaldehyde resin; anti-scorching agent CTP (N-cyclohexylthiophthalimide); Plasticizer A (mixture of high molecular fatty acids zinc soap), pentachlorothiophenol; homogenizing agents 40MS, 40MS(F), 60NS, 60NS(F) (composite resins of aromatic resin, naphthenic resin and aliphatic resin), TH10FL, TH20FL, 140, 145A, 260, H501; tackifiers petroleum resin PRF-80, PFR-90, PRF-100, PRF-110, C9 petroleum tackifier resin, complex C9 petroleum tackifier resin, modified alkylphenol resin TKM-M, TKM-T, TKM-O, p-tert-butylphenol fomaldehyde resin TKB-120, TKB-130, TKB-140, TKB-N, p-tert-octylphenol fomaldehyde resin TKO-70, TKO-80, TKO-90, TKO-100, TKO-110, coumarone resin, phenylethylene-indene resin type 90 and 100; releasing agent AT-16 (mixture of a surfactant and fatty acid calcium soap); adhesive agent including spherical cobalt decanoate RC-D20, cobalt naphthenate RC-10, cobalt stearate RC-S95; reinforcing agents reinforcing resin 205, oil-modified phenolic resin PF-P, PF-C, PF-O.

The preferable spherical rubber chemicals are antioxidants 4020 (N-1,3-dimethylbutyl-N'-phenyl-p-phenylenediamine), 4010NA (N-isopropyl-N'-phenyl-p-phenylenediamine), SPPD (N-phenyl-N'-α-methylbenzyl-p-phenylenediamine) RD (2,2,4-trimethyl-1,2-dihydroquinoline polymer) (n=2-4); vulcanization agents M (2-mercaptobenzothiazole), TBSI (N-tert-butyl-bis(2-benzothiazole) sulphenamide), CBBS (N-cyclohexyl-bis(2-benzothiazole) sulphenamide), OTTOS (N-oxydiethylenethiocarbamoyl-N'-tert-butyl sulphenamide), TBZTD (tetrabenzyl thiuram disulfide); anti-scorching agent CTP (N-cyclohexylthiophthalimide); Plasticizer A (mixture of high molecular zinc soap fatty acid); adhesive agent cobalt decanoate RC-D20, cobalt naphthenate RC-10, cobalt stearate RC-S95; releasing agent AT-16 (mixture of a surfactant and fatty acid calcium soap); homogenizing agents 40MS, 40MS(F), 60NS, 60NS(F) (composite resins of aromatic resin, naphthenic resin and aliphatic resin); tackifiers p-tert-octylphenol fomaldehyde resin TKO-70, TKO-80, TKO-90, TKO-100, TKO-110; reinforcing agents oil-modified phenolic resin PF-P, PF-C, PF-O.

The further preferable spherical rubber chemicals are antioxidant 4020 (N-1,3-dimethylbutyl-N'-phenyl-p-phenylenediamine) and 4010NA (N-isopropyl-N'-phenyl-p-phenylenediamine).

EXAMPLE

The following examples are intended to illustrate the present invention, but do not limit the scope of the invention.

Example 1

Figure 2:
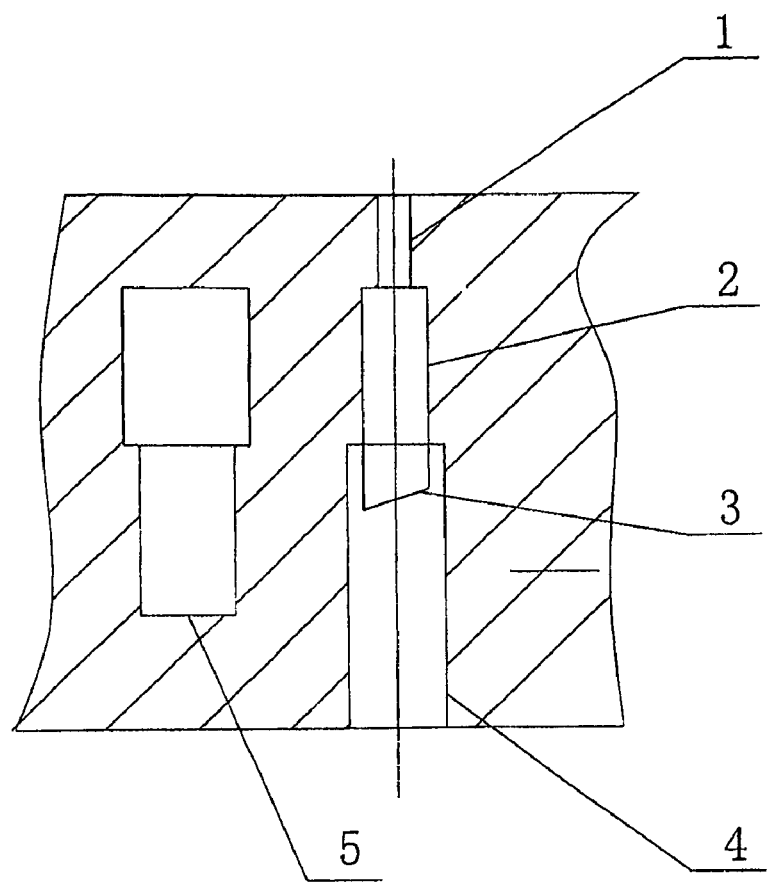
FIG. 2 is a schematic diagram of the distribution plate according to a preferable embodiment of the present invention, wherein "1" indicates the small hole, "2" indicates the intermediate hole, "3" indicates the nozzle, "4" indicates the large hole, i.e. a temperature-keeping hole, "5" indicates the temperature-keeping channel. In other embodiments of the present invention, the distribution plate may not include the large hole.

Preparation of Spherical Granules of N-1,3-dimethylbutyl-N'-phenyl-p-phenylenediamine The molten material of prepared N-1,3-dimethylbutyl-N'-phenyl-p-phenylenediamine (4020) in a storage tank was pumped to the precrystallizing system with a pump capacity of 600 kg/hour. The temperature of the cooling water for the precrystallizer was maintained at 28-32° C. and the temperature of the water for pipeline temperature-keeping was maintained at 46-48° C. After the material in the precrystallizer reached the discharging state, a discharging pump was started to deliver the material into the material tank. A jacket was provided outside the material tank for passing warm water of 48-49° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 48-49° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 49-59° C. The small holes in the distribution plate had a diameter of 2.5 mm, the intermediate holes had a diameter of 4 mm, and the distance between the inner wall of the large holes for temperature-keeping and the outer wall of the nozzles was 2 mm. The nozzles had a chamfer angle at the lower end, such as nozzle A shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of the cooling water was controlled at 20-35° C. to solidify the granules into solid spheres. The material flow then entered into the draining procedure in which an oscillating screen with frequency of 40 Hz was used. Then the material flow entered into the drying procedure with a vibrated fluidized bed, in which the temperature of the air-drying fluidizing gas was 40° C. The final product was packed after being dried to meeting the quality requirement. The produced spherical granules had good sphericity. One hundred (100) spherical granules collected randomly were measured for their diameters with a vernier caliper and the average diameter of the spherical granules was determined as 4.6 mm. The data exhibited a good normal distribution.

Example 2

Preparation of Spherical Granules of N-isopropyl-N'-phenyl-p-phenylenediamine

The molten material of prepared N-isopropyl-N'-phenyl-p-phenylenediamine (4010NA) in a storage tank was pumped to the precrystallizing system with a pump capacity of 600 kg/hour. The temperature of the cooling water for the precrystallizer was maintained at 55-60° C. and the temperature of the water for pipeline temperature-keeping was maintained at 75-80° C. After the material in the precrystallizer reached the discharging state, a discharging pump was actuated to deliver the material into the material tank. A jacket was provided outside the material tank for passing warm water of 78-83° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device.

There was warm water of 85-86° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 75-85° C. The small holes in the distribution plate had a diameter of 2.5 mm, the intermediate holes had a diameter of 4 mm, and the distance between the inner wall of the large holes for temperature-keeping and the outer wall of the nozzle was 2 mm. The nozzles had a chamfer angle at the lower end, such as nozzle A shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settle on the bottom of the cooling tower. The temperature of cooling water was controlled at 20-35° C. to solidify the granules into solid spheres. The material flow then entered into the draining and sieving procedure in which an oscillating screen with frequency of 40 Hz was used. Then the material flow entered into the drying procedure with a vibrated fluidized bed, in which the temperature of the air-drying fluidizing gas was 70° C. The final product was packed after being dried to meet the quality requirement. The produced spherical granules had good sphericity. One hundred (100) spherical granules randomly collected were measured for their diameters with a vernier caliper and the average diameter of the spherical granules we determined as 4.6 mm. The data exhibited a normal distribution.

Example 3

Preparation of Spherical Granules of 2,2,4-trimethyl-1,2-dihydroquinoline polymer (n=2-4) (RD)

The molten material of prepared 2,2,4-trimethyl-1,2-dihydroquinoline polymer (n=2-4) (RD) in a storage tank was pumped to the precrystallizing system with a pump capacity of 600 kg/hour. The temperature of the cooling water for the precrystallizer was maintained at 50-60° C. and the temperature of the water for pipeline temperature-keeping was maintained at 70-80° C. After the material in the precrystallizer reached the discharging state, a discharging pump was actuated to deliver the material into the material tank and the entire material tank was filled up with the material to maintain a pressure of 0.1-0.5 MPa. A jacket was provided outside the material tank for passing warm water of 75-85° C. The material tank was separated from the distribution plate with a thermal insulating layer which had openings only at places corresponding to the nozzles to allow the liquid material passing through the nozzles. The material entered into the distribution plate under the pressure produced from the discharging pump and was granulated therein with a dripping rate of 2-3 drops/second. The distribution plate included a plurality of equispaced holes and inner temperature-keeping channels. The temperature-keeping channels were filled with warm water of 80-85° C. The small holes in the distribution plate had a diameter of 2.5 mm, the intermediate holes had a diameter of 4 mm, and there was no large hole for temperature-keeping. The nozzles had a chamfer angle at the lower end, such as nozzle A shown in FIG. 3. After passing the nozzles, the material fell into a cooling tower with water as the cooling liquid. A surfactant cocoamidopropyl betaine was sprayed onto the water surface to facilitate the sedimentation of material granules. The granules fell down from top to bottom and settled on the bottom of the cooling tower. The temperature of the cooling water was controlled at 50-70° C. to solidify the granules into solid spheres. The material flow then entered into the draining and sieving procedure, in which an oscillating screen with frequency of 40 Hz was used. Then the material flow entered into the drying procedure with a vibrated fluidized bed, in which the temperature of the air-drying fluidizing gas was 70° C. The final product was packed after being dried to meet quality requirement. The produced spherical granules had good sphericity by visual examination. One hundred spherical granules randomly collected were measured for their diameters with a vernier caliper and the average diameter of the spherical granules was determined as 5 mm. The data exhibited a normal distribution.

Example 4

Preparation of Spherical Granules of N-tert-butyl-2-benzothiazole sulphenamide (Accelerator NS)

The molten material of prepared N-tert-butyl-2-benzothiazole sulphenamide (accelerator NS) in a storage tank was pumped to the material tank while maintaining the temperature of the material at 110° C. Heat steam of 110-115° C. was provided outside the material tank. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was heat steam passing through the coil pipe. The material entered into the distribution plate and was granulated therein with a dripping rate of 2-3 drops/second. The distribution plate mainly included a plurality of equispaced holes and inner temperature-keeping channels. The temperature-keeping channels were filled with heat steam. The small holes in the distribution plate had a diameter of 0.1 mm, the intermediate holes had a diameter of 0.25 mm, and there was no large hole for temperature-keeping. The nozzles had a chamfer angle at the lower end, such as nozzle C shown in FIG. 3. After passing the nozzles, the material fell into a cooling tower in which water was used as the cooling liquid. A surfactant AEO-7 was sprayed onto the water surface to facilitate the sedimentation of material granules. The granules fell down from top to bottom and settled on the bottom of the cooling tower. The temperature of the cooling water was controlled at 60-70° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 40° C. The final product was packed after being dried to meet quality requirement. The produced spherical granules had good sphericity. One hundred spherical granules randomly collected were measured for their diameters with a vernier caliper and the average diameter of the spherical granules was determined as 0.2 mm. The data exhibited a good normal distribution.

Example 5

Preparation of Spherical Granules of N-1,3-dimethylbutyl-N'-phenyl-p-phenylenediamine The molten material of prepared N-1,3-dimethylbutyl-N'-phenyl-p-phenylenediamine (4020) in a storage tank was pumped to the precrystallizing system with a pump capacity of 600 kg/hour. The temperature of the cooling water for the precrystallizer was maintained at 28-32° C. and the temperature of the water for pipeline temperature-keeping was maintained at 46-48° C. After the material in the precrystallizer reached the discharging state, a discharging pump was actuated to deliver the material into the material tank. A jacket was provided outside the material tank for passing warm water of 48-49° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 48-49° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 49-59° C. The small holes in the distribution plate had a diameter of 0.1 mm, the intermediate holes had a diameter of 0.2 mm, and the distance between the inner wall of the large holes for temperature-keeping and the outer wall of the nozzles was 2 mm. The nozzles had a chamfer angle at its lower end, such as nozzle A shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of the cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, the temperature of the air-drying fluidizing gas is 40° C. The final product was packed after being dried to meet quality requirement. The produced spherical granules had good sphericity. One hundred spherical granules randomly collected were measured for their diameters with a vernier caliper and the average diameter of the spherical granules was determined as 0.22 mm. The data exhibited a good normal distribution.

Example 6

Preparation of Spherical Granules of N-1,3-dimethylbutyl-N'-phenyl-p-phenylenediamine The molten material of prepared N-1,3-dimethylbutyl-N'-phenyl-p-phenylenediamine (4020) in a storage tank was pumped to the precrystallizing system with a pump capacity of 600 kg/hour. The temperature of cooling water for the precrystallizer was maintained at 28-32° C. and the temperature of the water for pipeline temperature-keeping was maintained at 46-48° C. After the material in the precrystallizer reached the discharging state, a discharging pump was actuated to deliver the material into the material tank. A jacket was provided outside the material tank for passing warm water of 48-49° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 48-49° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 49-59° C. The small holes in the distribution plate had a diameter of 5 mm, the intermediate holes had a diameter of 8 mm, and the distance between the inner wall of the large holes for temperature-keeping and the outer wall of the nozzles was 2 mm. The nozzle had a chamfer angle at the lower end, such as nozzle A shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was determined as 9.2 mm. The data exhibited a good normal distribution.

Example 7

Preparation of Spherical N-isopropyl-N'-phenyl-p-phenylenediamine granules

The molten material of prepared N-isopropyl-N'-phenyl-p-phenylenediamine (4010NA) in a storage tank was pumped to the precrystallizing system with a pump capacity of 600 kg/hour. The temperature of the cooling water for the precrystallizer was maintained at 55-60° C. and the temperature of the water for pipeline temperature-keeping was maintained at 75-80° C. After the material in the precrystallizer reached the discharging state, a discharging pump was actuated to deliver the material into the material tank. A jacket was provided outside the material tank for passing warm water of 78-83° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 85-86° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 75-85° C. The small holes in the distribution plate had a diameter of 2.5 mm, the intermediate holes had a diameter of 4 mm, and the distance between the inner wall of the large hole for temperature-keeping and the outer wall of the nozzles was 2 mm. The nozzles had a chamfer angle at the lower end, such as nozzle A shown in FIG. 3. After passing the nozzles, the material fell into a cooling tower with water as the cooling liquid. Ultrasonic transducers were equipped at four corners on the water surface to produce vibration facilitating the sedimentation of material granules. The granules fell down from top to bottom and settled on the bottom of the cooling tower. The temperature of the cooling water was controlled at 20-35° C. to solidify the granules into solid spheres. The material flow then entered into the draining and sieving procedure, in which an oscillating screen with frequency of 40 Hz was used. Then the material flow entered into the drying procedure with a vibrated fluidized bed, the temperature of the air-drying fluidizing gas was 70° C. The final product was packed after being dried to meet quality requirement. The produced spherical granules had good sphericity by visual examination. One hundred spherical granules selected randomly were measured for their diameters with a vernier caliper and the average diameter of the spherical granules was determined as 4.6 mm. The data exhibited a normal distribution.

Example 8

Preparation of Spherical Granules of N-1,3-dimethylbutyl-N'-phenyl-p-phenylenediamine (with Aqueous Ammonia as the Cooling Liquid)

The molten material of prepared N-1,3-dimethylbutyl-N'-phenyl-p-phenylenediamine (4020) in a storage tank was pumped to the precrystallizing system with a pump capacity of 600 kg/hour. The temperature of the cooling water for the precrystallizer was maintained at 28-32° C. and the temperature of the water for pipeline temperature-keeping was maintained at 46-48° C. After the material in the precrystallizer reached the discharging state, a discharging pump was used to deliver the material into the material tank. A jacket was provided outside the material tank for passing warm water of 48-49° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 48-49° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 49-59° C. The small holes in the distribution plate had a diameter of 3.5 mm, the intermediate holes had a diameter of 6 mm, and the distance between the inner wall of the large holes for temperature-keeping and the outer wall of the nozzles was 2 mm. The nozzles had a chamfer angle at the lower end, such as nozzle A shown in FIG. 3. After passing the nozzles, the material fell into a cooling tower with aqueous ammonia of 6% (w/w) as the cooling liquid. A surfactant AEO-7 was sprayed onto the liquid surface to facilitate the sedimentation of material granules. The granules fell down from top to bottom and settled on the bottom of the cooling tower. The temperature of cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was 6.6 mm. The data exhibited a good normal distribution.

Example 9

Preparation of Spherical Granules of N-1,3-dimethylbutyl-N'-phenyl-p-phenylenediamine (with Aqueous Solution of Methanol as the Cooling Liquid)

The molten material of prepared N-1,3-dimethylbutyl-N'-phenyl-p-phenylenediamine (4020) in a storage tank was pumped to the precrystallizing system with a pump capacity of 600 kg/hour. The temperature of the cooling water for the precrystallizer was maintained at 28-32° C. and the temperature of the water for pipeline temperature-keeping was maintained at 46-48° C. After the material in the precrystallizer reached the discharging state, a discharging pump was actuated to deliver the material into the material tank. A jacket was provided outside the material tank for passing warm water of 48-49° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 48-49° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 49-59° C. The small holes in the distribution plate had a diameter of 1.0 mm, the intermediate holes had a diameter of 3 mm, and the distance between the inner wall of the large holes for temperature-keeping and the outer wall of the nozzles was 2 mm. The nozzles had a chamfer angle at its lower end, such as nozzle A shown in FIG. 3. After passing the nozzles, the material fell into a cooling tower with an aqueous solution of methanol containing 20% (w/w) methanol as the cooling liquid. A surfactant cocoamidopropyl betaine was sprayed onto the liquid surface to facilitate the sedimentation of material granules. The granules fell down from top to bottom and settle on the bottom of the cooling tower. The temperature of the cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was determined as 3.2 mm. The data exhibits a good normal distribution.

Example 10

Preparation of Spherical Granules of N-tert-butyl-bis (2-benzothiazole) sulphenamide (Accelerator TBSI) (Melting Point: 130-133° C.)

The molten material of prepared N-tert-butyl-bis(2-benzothiazole) sulphenamide (accelerator TBSI) in a storage tank was pumped to the material tank while maintaining the material temperature at 135° C. Heat conducting oil of 135-140° C. was provided outside the material tank. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was heat conducting oil passing through the coil pipe. The material entered into the distribution plate and was granulated therein with a dripping rate of 2-3 drops/second. The distribution plate mainly included a plurality of equispaced holes and inner temperature-keeping channels for passing the heat conducting oil. The small holes in the distribution plate had a diameter of 2.5 mm, the intermediate holes had a diameter of 4 mm, and there was no large hole for temperature-keeping. The nozzles had a chamfer angle at the lower end, such as nozzle C shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of the cooling water was controlled at 60-70° C. to solidify the granules into solid spheres. The material flow then entered into the draining procedure, in which an oscillating screen with frequency of 40 Hz was used. Then the material flow entered into the drying procedure with a vibrated fluidized bed, the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was 4.5 mm. The data exhibited a good normal distribution.

Example 11

Preparation of Spherical Granules of tetrabenzyl thiuram disulfide (Accelerator TBZTD) (Melting Point: 130° C.)

The molten material of prepared tetrabenzyl thiuram disulfide (accelerator TBZTD) in a storage tank was pumped to the material tank while maintaining the material temperature at 132° C. Heat conducting oil of 133-135° C. was provided outside the material tank. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was heat conducting oil passing through the coil pipe. The material entered into the distribution plate and was granulated therein with a dripping rate of 2-3 drops/second. The distribution plate mainly included a plurality of equispaced holes and inner temperature-keeping channels for passing heat conducting oil. The small holes in the distribution plate had a diameter of 2.5 mm, the intermediate holes had a diameter of 4 mm, and the distance between the inner wall of the large holes for temperature-keeping and the outer wall of the nozzles was 2 mm. The nozzles had a chamfer angle at the lower end, such as nozzle C shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of the cooling water was controlled at 60-70° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was 4.8 mm. The data exhibited a good normal distribution.

Example 12

Preparation of Spherical Granules of N-phenyl-N'-α-methylbenzyl-p-phenylenediamine (SPPD) (Melting Point: 54.8° C.)

The molten material of prepared N-phenyl-N'-α-methylbenzyl-p-phenylenediamine (SPPD) in a storage tank was pumped to the precrystallizing system with a pump capacity of 600 kg/hour. The temperature of cooling water for the precrystallizer was maintained at 65-75° C. and the temperature of the water for pipeline temperature-keeping was maintained at 86-90° C. After the material in the precrystallizer reached the discharging state, a discharging pump was actuated to deliver the material into the material tank. A jacket was provided outside the material tank for passing warm water of 88-93° C. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was warm water of 85-86° C. passing through the coil pipe. The material entered into the distribution plate and was granulated therein with a dripping rate of 2-3 drops/second. The distribution plate mainly included a plurality of equispaced holes and inner temperature-keeping channels, for example as shown in FIG. 2. The temperature-keeping channels were filled with warm water of 86-90° C. The small holes in the distribution plate had a diameter of 2.5 mm, the intermediate holes had a diameter of 4 mm, and a distance between the inner wall of a large warm-keeping hole and the outer wall of a nozzle was 2 mm. The nozzle has a chamfer angle at its lower end, such as nozzle A shown in FIG. 3. After passing the nozzles, the material falls into a cooling tower with water as the cooling liquid. A surfactant AEO-7 was sprayed onto the water surface to facilitate the sedimentation of material granules. The granules fall down from top to bottom and settle on the bottom of the cooling tower. The temperature of cooling water was controlled at 20-35° C. to solidify the granules into solid spheres. The material flow then entered into the draining and sieving procedure, in which an oscillating screen with frequency of 40 Hz was used. Then the material flow entered into the drying procedure with a vibrated fluidized bed, the temperature of air-drying fluidizing gas was 75° C. The final product was packed after being dried to meet quality requirement. The produced spherical granules had good sphericity by visual examination. One hundred spherical granules selected randomly were measured for their diameters with a vernier caliper and the calculated average diameter of spherical granules was 4.4 mm. The data exhibits a normal distribution.

Example 13

Preparation of Spherical
N-cyclohexylthiophthalimide (CTP) Granules
(Melting Point ≧90° C.)

The molten material of prepared N-cyclohexylthiophthalimide (CTP) in a storage tank was pumped to the material tank while maintaining the material temperature at 93° C. Warm water of 92-95° C. was provided outside the material tank. The material tank was separated from the distribution plate with a thermal insulating layer which merely has openings corresponding to the nozzles to allow the liquid material to pass through the nozzles. Meanwhile, a reciprocating device over the material tank was actuated. A coil pipe was located under and connected to the reciprocating device. There was warm water of 90-95° C. passing through the coil pipe. The material enters into the distribution plate and was granulated therein with a dripping rate of 2-3 drops/second. The distribution plate mainly includes a plurality of equispaced holes and inner warm-keeping channels for passing warm water of 95-100° C. The small holes in the distribution plate had a diameter of 2.5 mm, the intermediate holes had a diameter of 4 mm, and the distance between the inner wall of the large holes for temperature-keeping and the outer wall of the nozzles was 2 mm. The nozzles had a chamfer angle at the lower end, such as nozzle C shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of the cooling water was controlled at 55-60° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 35° C. The final product was packed after being dried to meet quality requirement. The produced spherical granules had good sphericity. One hundred spherical granules selected randomly were measured for their diameters with a vernier caliper and the average diameter of spherical granules was 5 mm. The data exhibited a good normal distribution.

Example 14

Preparation of Spherical Granules of Cobalt Stearate
RC-S95 (Adhesive Agent) (Softening Point;
80-100° C.)

The molten material of prepared cobalt stearate RC-S95 (adhesive agent) in a storage tank was pumped to the material tank while maintaining the material temperature at 105° C. Heating steam of 105-110° C. was provided outside the material tank. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was heating steam passing through the coil pipe. The material entered into the distribution plate and was granulated therein with a dripping rate of 2-3 drops/second. The distribution plate mainly included a plurality of equispaced holes and inner warm-keeping channels for passing heating steam. The small holes in the distribution plate had a diameter of 2.5 mm, the intermediate holes had a diameter of 4 mm, and there was no large holes for temperature-keeping hole. The nozzles had a chamfer angle at the lower end, such as nozzle C shown in FIG. 3. After passing the nozzles, the material fell into a cooling tower in which water was used as the cooling liquid. A surfactant AEO-7 was sprayed onto the water surface to facilitate the sedimentation of material granules. The granules fell down from top to bottom and settle on the bottom of the cooling tower. The temperature of cooling water was controlled at 60-70° C. to solidify the granules into solid spheres. The material flow then entered into the draining procedure, in which an oscillating screen with frequency of 40 Hz was used. Then the material flow entered into the drying procedure with a vibrated fluidized bed, the temperature of air-drying fluidizing gas was 60° C. The final product was packed after being dried to meet quality requirement. The produced spherical granules had good sphericity. One hundred spherical granules selected randomly were measured for their diameters with a vernier caliper and the average diameter of spherical granules was determined as 4.8 mm. The data exhibited a good normal distribution.

Example 15

Preparation of Spherical Granules of Plasticizer A
(Mixture of High Molecular Fatty Acid Zinc Soap)
(Melting Point: 98-104° C.)

The prepared mixture of high molecular fatty acid zinc soap (Plasticizer A) in a storage tank was pumped to the material tank while maintaining the material temperature at 105° C. Heating steam of 105-115° C. was provided outside the material tank. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was heating steam passing through the coil pipe. The material entered into the distribution plate and was granulated therein with a dripping rate of 2-3 drops/second. The distribution plate mainly included a plurality of equispaced holes and inner temperature-keeping channels for passing heating steam. The small holes in the distribution plate had a diameter of 2.5 mm, the intermediate holes had a diameter of 4 mm, and there was no large hole for temperature-keeping. The nozzles had a chamfer angle at the lower end, such as nozzle C shown in FIG. 3. After passing the nozzles, the material fell into a cooling tower with water as the cooling liquid. Ultrasonic transducers were equipped at four corners on the water surface to produce vibration for facilitating the sedimentation of material granules. The granules fell down from top to bottom and settled on the bottom of the cooling tower. The temperature of cooling water was controlled at 60-70° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of air-drying fluidizing gas was 60° C. The final product was packed after being dried to meet quality requirement. The produced spherical granules had good sphericity. One hundred (100) spherical granules selected randomly were measured for their diameters with a vernier caliper and the average diameter of the spherical granules was determined as 4.7 mm. The data exhibited a good normal distribution.

Example 16

Preparation of Spherical Granules of Composite Resin (40MS) Composed of an Aromatic Resin, a Naphthenic Resin and an Aliphatic Resin (Softening Point: 50-60° C.)

The prepared composite resin (40MS) composed of an aromatic resin, a naphthenic resin and an aliphatic resin in a storage tank was pumped to the material tank while maintaining the material temperature at 60° C. Warm water of 60-65° C. was provided outside the material tank. The material tank was separated from the distribution plate with a thermal insulating layer which had openings only at places corresponding to the nozzles to allow the liquid material passing through the nozzles. Meanwhile, a high-viscosity pump over the material tank was actuated. A coil pipe was located under and connected to the pump. There was warm water of 60-63° C. passing through the coil pipe. The material entered into the distribution plate and was granulated therein with a dripping rate of 2-3 drops/second. The distribution plate mainly included a plurality of equispaced holes and inner temperature-keeping channels for passing warm water of 65-68° C. The small holes in the distribution plate had a diameter of 2.5 mm, the intermediate holes had a diameter of 4 mm, and there was no large hole for temperature-keeping. The nozzles had a chamfer angle at the lower end, such as nozzle C shown in FIG. 3. After passing the nozzles, the material fell into a cooling tower with water as the cooling liquid. Ultrasonic transducers were equipped at four corners on the water surface to produce vibration for facilitating the sedimentation of material granules. The granules fell down from top to bottom and settled on the bottom of the cooling tower. The temperature of cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was determined as 4.6 mm. The data exhibited a good normal distribution.

Example 17

Preparation of Spherical Granules of Para-Tert-Octylphenol Formaldehyde Resin (TKO-70) (Softening Point: 70-85° C.)

The prepared para-tert-octylphenol formaldehyde resin (TKO-70) in a storage tank was pumped to the material tank while maintaining the material temperature at 85° C. Warm water of 85-88° C. was provided outside the material tank. The material tank was separated from the distribution plate with a thermal insulating layer which had openings only at places corresponding to the nozzles to allow the liquid material passing through the nozzles. Meanwhile, a high-viscosity pump over the material tank was actuated. A coil pipe was located under and connected to the pump. There was warm water of 85-88° C. passing through the coil pipe. The material entered into the distribution plate and was granulated therein with a dripping rate of 2-3 drops/second. The distribution plate mainly included a plurality of equispaced holes and inner temperature-keeping channels for passing warm water of 85-90° C. The small holes in the distribution plate had a diameter of 2.5 mm, the intermediate holes had a diameter of 4 mm, and there was no large hole for temperature-keeping. The nozzle had a chamfer angle at the lower end, such as nozzle C shown in FIG. 3. After passing the nozzles, the material fell into a cooling tower with water as the cooling liquid. Ultrasonic transducers were equipped at four corners on the water surface to produce vibration for facilitating the sedimentation of material granules. The granules fell down from top to bottom and settled on the bottom of the cooling tower. The temperature of cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 40° C. The final product was packed after being dried to meet quality requirement. The produced spherical granules had good sphericity. One hundred spherical granules selected randomly were measured for their diameters with a vernier caliper and the average diameter of the spherical granules was determined as 5 mm. The data exhibited a good normal distribution.

Example 18

Preparation of Spherical Granules of Oil-Modified Phenolic Resin (PF-P) (Softening Point: 75-90° C.)

The prepared oil-modified phenolic resin (PF-P) in a storage tank was pumped to the material tank while maintaining the material temperature at 90° C. Warm water of 90-95° C. was provided outside the material tank. The material tank was separated from the distribution plate with a thermal insulating layer which had openings only at places corresponding to the nozzles to allow the liquid material passing through the nozzles. Meanwhile, a high-viscosity pump over the material tank was actuated. A coil pipe was located under and connected to the pimp. There was warm water of 90-95° C. passing through the coil pipe. The material entered into the distribution plate and was granulated therein with a dripping rate of 2-3 drops/second. The distribution plate mainly included a plurality of equispaced holes and inner temperature-keeping channels for passing warm water of 90-98° C. The small holes in the distribution plate had a diameter of 2.5 mm, the intermediate holes had a diameter of 4 mm, and there was no large hole for temperature-keeping. The nozzles had a chamfer angle at the lower end, such as nozzle C shown in FIG. 3. After passing the nozzles, the material fell into a cooling tower with water as the cooling liquid. Ultrasonic transducers were equipped at four corners on the water surface to produce vibration for facilitating the sedimentation of material granules. The granules fell down from top to bottom and settled on the bottom of the cooling tower. The temperature of the cooling water was controlled at 20-35° C. to solidify the granules into solid spheres. The material flow then entered into the draining procedure, in which an oscillating screen with frequency of 40 Hz was used. Then the material flow entered into the drying procedure with a vibrated fluidized bed, the temperature of air-drying fluidizing gas was 40° C. The final product was packed after being dried to meet quality requirement.

The produced spherical granules had good sphericity. One hundred spherical granules selected randomly were measured for their diameters with a vernier caliper and the average diameter of the spherical granules was determined as 4.8 mm. The data exhibited a good normal distribution.

Example 19

Preparation of Spherical Granules of Internal Releasing Agent AT-16 (a Mixture of a Surfactant and Fatty Acid Calcium Soap) (Softening Point: 85-100° C.)

The molten material of a prepared mixture of a surfactant and fatty acid calcium soap in a storage tank was pumped to the material tank while maintaining the material temperature at 105° C. Heating steam of 105-110° C. was provided outside the material tank. The material tank was separated from the distribution plate with a thermal insulating layer which had openings only at places corresponding to the nozzles to allow the liquid material passing through the nozzles. Meanwhile, a reciprocating motion device over the material tank was actuated. A coil pipe was located under and connected to the reciprocating device. There was heating steam passing through the coil pipe. The material entered into the distribution plate and was granulated therein with a dripping rate of 2-3 drops/second. The distribution plate mainly included a plurality of equispaced holes and inner warm-keeping channels for passing heating steam. The small holes in the distribution plate had a diameter of 2.5 mm, the intermediate holes had a diameter of 4 mm, and there was no large hole for temperature-keeping. The nozzles had a chamfer angle at the lower end, such as nozzle C shown in FIG. 3. After passing the nozzles, the material fell into a cooling tower with water as the cooling liquid. A surfactant AEO-7 was sprayed onto the water surface to facilitate the sedimentation of material granules. The granules fell down from top to bottom and settled on the bottom of the cooling tower. The temperature of cooling water was controlled at 60-70° C. to solidify the granules into solid spheres. The material flow then entered into the draining procedure, in which an oscillating screen with frequency of 40 Hz was used. Then the material flow entered into the drying procedure with a vibrated fluidized bed, in which the temperature of the air-drying fluidizing gas was 60° C. The final product was packed after being dried to meet quality requirement. The produced spherical granules had good sphericity. One hundred spherical granules selected randomly were measured for their diameters with a vernier caliper and the average diameter of the spherical granules was determined as 5.1 mm. The data exhibited a good normal distribution.

We claim:

1. A method for preparing spherical rubber chemicals, comprising an overhead granulation step, a step of cooling and forming in a cooling liquid and a cooling liquid-removing step, wherein, in the overhead granulation step, a material tank and a distribution plate are detached from each other and are separated by a thermal insulating layer.

2. The method according to claim 1, wherein further comprising a pre-crystallizing step prior to the overhead granulation step.

3. The method according to claim 1, wherein, in the overhead granulation step, a heating and/or cooling medium is provided for the distribution plate, small holes and intermediate holes are disposed from top to bottom in the distribution plate, the small holes have a diameter of 0.1-5 mm and the intermediate hole nozzles have a diameter of 0.2-10 mm.

4. The method according to claim 3, wherein large holes are disposed below the intermediate holes with a distance of 0.5-5 mm between the inner wall of a large hole and the outer wall of a intermediate hole nozzle.

5. The method according to any one of claim 1, wherein, in the overhead granulation step, a chamfer angle is disposed at the lower end of the nozzle.

6. The method according to any one of claim 1, wherein, in the overhead granulation step, the material drips naturally by gravity, under pressure by a reciprocating motion or under a constant pressure by a high viscosity feeding pump.

7. The method according to claim 6, wherein dripping under pressure by a reciprocating motion is adopted in the overhead granulation step.

8. The method according to any one of claim 1, wherein, in the overhead granulation step, the dripping rate from a nozzle is 1-4 drops/second.

9. The method according to any one of claim 1, wherein, in the cooling and forming step, a surfactant is added into the cooling liquid in a cooling tower and/or ultrasonic wave is applied to the cooling liquid.

10. The method according to claim 9, wherein the cooling liquid is at least one selected from the group consisting of water, aqueous ammonia, an aqueous solution of a salt and an organic substance.

11. The method according to claim 10, wherein the cooling liquid is selected from the group consisting of water, aqueous ammonia, an aqueous solution of methanol, an aqueous solution of sodium chloride, gasoline or acetone.

12. The method according to claim 9, wherein the surfactant is at least one selected from the group consisting of polyethylene glycol ether, polypropylene glycol ether, fatty alcohol polyoxyethylene ether, alkyl benzene sulfonate compound, quaternary ammonium salt compound, alkyl alcohol ammonium type surfactant and betaine type surfactant.

13. The method according to claim 12, wherein the fatty alcohol in the fatty alcohol polyoxyethylene ether has 6-18 carbon atoms and the polymerization degree of polyoxyethylene is 3-25.

14. The method according to claim 12, wherein the betaine type surfactant is selected from a group consisting of cocoamidopropyl betaine, dimethylalkyl betaine and N,N-dimethyl-N-alkoxymethylene betaine.

* * * * *

UNITED STATES PATENT AND TRADEMARK OFFICE
CERTIFICATE OF CORRECTION

| | | |
|---|---|---|
| PATENT NO. | : 8,066,919 B2 | Page 1 of 1 |
| APPLICATION NO. | : 12/445900 | |
| DATED | : November 29, 2011 | |
| INVENTOR(S) | : Nongyue Wang et al. | |

It is certified that error appears in the above-identified patent and that said Letters Patent is hereby corrected as shown below:

On the Title Page, Item (75) Inventor, delete "Qianwan Cheng" and insert --Qianwen Cheng--.

Signed and Sealed this
Thirty-first Day of January, 2012

David J. Kappos
*Director of the United States Patent and Trademark Office*